United States Patent [19]

Fujii et al.

[11] Patent Number: 5,272,737
[45] Date of Patent: Dec. 21, 1993

[54] NUCLEAR REACTOR INSTALLATION

[75] Inventors: Tadashi Fujii, Hitachi; Yoshiyuki Kataoka, Ibaraki; Tohru Fukui, Hitachi; Masataka Hidaka, Hitachi; Toshitsugu Nakao, Hitachi; Shigeo Hatamiya, Hitachi; Hiroaki Suzuki, Hitachi; Masanori Naitoh, Hitachi; Isao Sumida, Ibaraki; Kenji Tominaga; Tsuyoshi Niino, both of Hitachi, all of Japan

[73] Assignee: Hitachi, Ltd., Tokyo, Japan

[21] Appl. No.: 760,968

[22] Filed: Sep. 17, 1991

[30] Foreign Application Priority Data

Sep. 17, 1990 [JP] Japan .................. 2-244049

[51] Int. Cl.$^5$ ................................. G21C 9/00
[52] U.S. Cl. .................... 376/283; 376/293; 376/298
[58] Field of Search ............ 376/282, 283, 298, 293

[56] References Cited

U.S. PATENT DOCUMENTS

| 3,207,671 | 9/1965 | Kornbichler | 176/38 |
| 3,580,806 | 5/1971 | Weems et al. | 376/284 |
| 3,718,539 | 2/1973 | West et al. | 376/283 |
| 3,725,198 | 4/1973 | Harstead et al. | 376/283 |
| 3,929,567 | 12/1975 | Schabert et al. | 376/282 |
| 3,937,651 | 2/1976 | Schabert et al. | 376/287 |
| 4,033,815 | 7/1977 | Webber et al. | 176/87 |
| 4,950,448 | 8/1990 | Gou et al. | 376/283 |
| 5,011,652 | 4/1991 | Tominaga et al. | 376/283 |
| 5,096,659 | 3/1992 | Hidaka et al. | 376/283 |
| 5,102,617 | 4/1992 | Gluntz | 376/283 |

FOREIGN PATENT DOCUMENTS

| 2274120 | 6/1975 | France . |
| 5931484 | 8/1982 | Japan . |
| 63-223310 | 9/1988 | Japan . |
| 63-246956 | 9/1988 | Japan . |

Primary Examiner—Donald P. Walsh
Assistant Examiner—Frederick H. Voss
Attorney, Agent, or Firm—Antonelli, Terry, Stout & Kraus

[57] ABSTRACT

There is disclosed a nuclear reactor installation. An accumulator-type emergency core cooling system, a gravity-driven core cooling system and an equalizing system for submerging a reactor core are provided within a primary containment vessel containing a reactor pressure vessel in which the reactor core is disposed. These cooling systems are automatically operated sequentially in accordance with the pressure in the reactor pressure vessel without the need for any particular powered source. The primary containment vessel is made of steel, and the interior of this containment vessel is divided into a space containing the reactor pressure vessel and a space containing an operation floor in such a manner that the two spaces are isolated from each other. An opening device is provided between the two spaces so as to communicate the two spaces with each other in the event of an accident, the upper portion of the primary containment vessel being air-cooled while the lower portion of this containment vessel being water-cooled.

14 Claims, 16 Drawing Sheets

F I G. 2
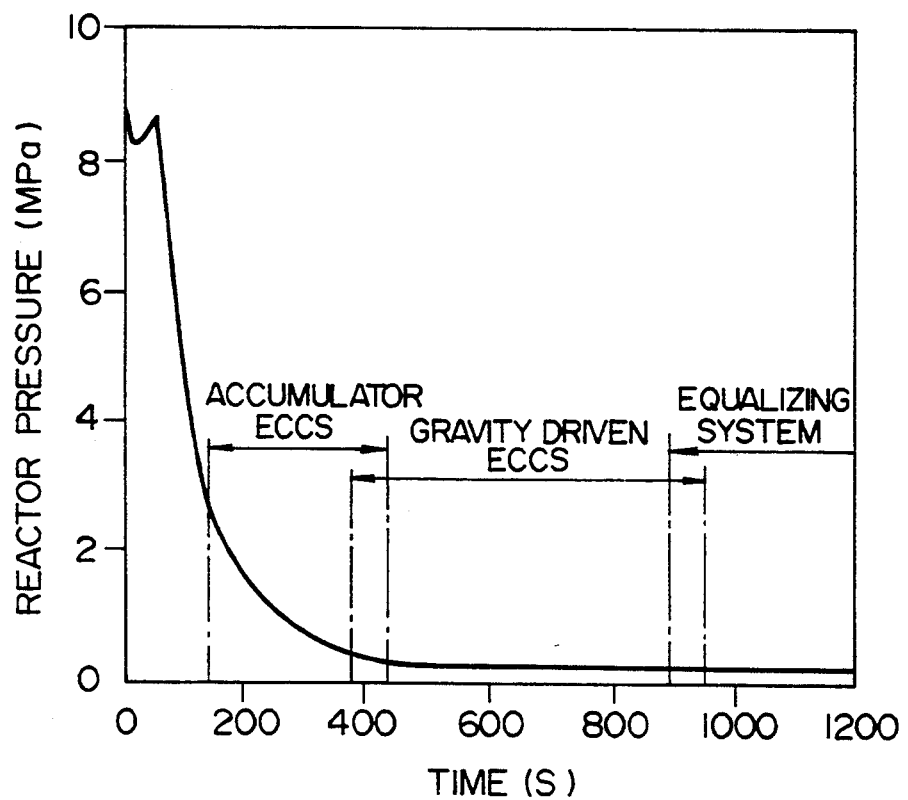

NUCLEAR REACTOR INSTALLATION

BACKGROUND OF THE INVENTION

This invention relates generally to a cooling technique for a nuclear reactor installation, and more particularly to techniques suited for cooling and submerging a reactor core in the event of a coolant loss accident, and for removing decay heat produced at the reactor core, and for suppressing the increase of pressure within a containment vessel.

In a convectional boiling reactor having an electric output of up to 1,100 MW, a large amount of steam, produced from a ruptured portion at the time of a coolant loss accident, is led into a pressure suppression pool, provided below a reactor pressure vessel, and is condensed there, thereby suppressing the increase of pressure within a primary containment vessel to below an allowable level. Then, an emergency core cooling system (ECCS), which comprises a high-pressure core spray system, a low-pressure core spray system, a low-pressure pouring system and an automatic depressurization system, is operated to pump up the water of the suppression pool to cool the reactor core. At this time, a residual heat removal system feeds, by a pump, the water of the suppression pool to a heat exchanger disposed outside of the containment vessel, thereby removing decay heat from the reactor core.

On the other hand, in a small- to a medium-size boiling reactor having an electric output of up to 600 MW, in order to simplify the installation and to achieve a high safety, it has been proposed that an emergency core cooling system excludes the use of powered equipment, such as a pump, and instead employs a dual accumulator pouring system using a passive method in which gas pressure is beforehand applied to a water reservoir for pouring water to the reactor core under a pressure differential between the water reservoir and the reactor core so as to cool the reactor core upon emergency. Thus, the system heretofore used in the conventional reactor is omitted.

Also, with respect to a small- to a medium-size reactor, Japanese Patent Unexamined Publication No. 63-191096 discloses a system in which the decay heat during a long cooling period after a coolant loss accident is removed by a passive method using a natural force. More specifically, an outer pool is provided around a primary containment vessel, and by utilizing a natural convection of a pressure suppression pool and the outer pool, with the surface of the containment vessel used as a heat transfer surface, the heat is transferred to the outer pool due to a temperature difference between the two pools so as to evaporate the pool water to thereby achieve the cooling.

As described above, the containment vessel in the small- to the medium-size reactor is of such a construction that the steam of high temperature and pressure which has leaked into the primary containment vessel, is led into a pressure suppression chamber in the primary containment vessel so that the steam of high temperature and pressure is condensed by the pressure suppression pool within this chamber.

The system used in the large-size reactor, along the prior art, requires auxiliary powered equipment, including a pump, a heat exchanger and an emergency power source, in order to cool the reactor core and also to remove decay heat produced at the core at the time of a coolant loss accident. Therefore, the construction of the plant becomes complicated, which poses a problem that attention is required so as not to lower the reliability when, for example, the power source is subjected to a malfunction.

On the other hand, if the accumulator pouring system and the outer pool use as the safety equipment for the small- to the medium-size reactor, are adopted to the large-size reactor, the construction of the plant of the large-size reactor can be simplified; however, if they are merely adopted, the size of the primary containment vessel for accommodating the reactor pressure vessel and the pressure suppression chamber becomes excessively large in order to increase the area of heat radiation to the water of the outer pool so as to cope with a large power output.

SUMMARY OF THE INVENTION

It is a first object of this invention to provide an emergency core cooling system (ECCS) for rapidly cooling and submerging a core of a nuclear reactor in the event of a coolant loss accident, which is simple in construction, and can be automatically operated in a reliable manner without the need for any special power means.

A second object of the invention is to provide a nuclear reactor installation in which decay heat produced from a reactor is efficiently removed to achieve a long-period cooling function. According to one aspect of the present invention, there is provided a nuclear reactor installation built within a building, the nuclear reactor installation comprising a reactor pressure vessel containing a reactor core which produces steam having a steam pressure; a concrete structure portion enclosing and holding the reactor pressure vessel; a dry well formed within the concrete structure portion and enclosing the reactor pressure vessel; a primary containment vessel enclosing the concrete structural portion; a pressure suppression chamber having a pressure suppression pool; and a vent tube communicating the dry well with the pressure suppression pool;

the installation comprising an accumulator-type emergency core cooling system, a gravity-driven emergency core cooling system and an equalizing system for submerging said reactor core, which are mounted within the primary containment vessel, the equalizing system being adapted to feed water from the suppression pool to the reactor core so as to submerge the latter;

wherein when the steam pressure in the reactor core decreases upon a coolant loss accident, the accumulator-type emergency core cooling system is operated to supply cooling water into the reactor pressure vessel to cool the reactor core; when the pressure in the reactor pressure vessel further decreases during the above cooling operation, the gravity-driven emergency core cooling system is operated to feed a large amount of cooling water into the reactor pressure vessel so as to allow the cooling water to overflow through a broken part into the lower portion of the dry well which is therefore filled with the cooling water, and then the cooling water is fed via the vent tube to the suppression pool in the suppression chamber to raise the water level of the suppression pool; and subsequently when the water level of the suppression pool becomes high as compared with the pressure in the reactor pressure vessel, the equalizing system is operated to supply the water from the suppression pool into the reactor pressure vessel to submerge and cool the reactor core.

According to another aspect of the present invention, there is provided a nuclear reactor installation comprising: a reactor pressure vessel having a reactor core and an equalizing system for submerging the reactor core; a concrete structural portion enclosing and holding the reactor pressure vessel; a primary containment vessel made of steel enclosing the reactor pressure vessel and an operation floor; an outer pool surrounding the lower portion of the primary containment vessel; and an air-cooling system covering the upper portion of the primary containment vessel; wherein the upper wall of the concrete structural portion is connected air-tight to the inner periphery of the primary containment vessel; the operation floor is provided in that portion of the primary containment vessel which is disposed above the upper wall of the concrete structural portion; and the space of the operation floor is connected to that portion of the primary containment vessel which is disposed below the upper wall of the concrete structural portion through at least one pressure-responsive opening means which is opened when a pressure difference therebetween becomes higher than a predetermined level.

With the construction of the present invention, when the pressure in the reactor pressure vessel decreases in the event of a coolant loss accident, the accumulator-type emergency core cooling system, the gravity-driven emergency core cooling system and the equalizing system are automatically operated sequentially. These systems are operated merely depending on the pressure difference between each of the emergency cooling systems and the reactor pressure vessel, without requiring any particular drive power, and therefore there can be provided the emergency core cooling system which is simple in construction and is reliable in operation.

The reactor pressure vessel and the operation floor are contained in the primary containment vessel made of steel, and in the normal condition the pressure space containing the reactor pressure vessel is isolated from the space containing the operation floor, and in the case of emergency, the two spaces are communicated with each other by the opening means which is operated in accordance with the pressure difference between the two spaces. The upper portion of the primary containment vessel is air-cooled, and the lower portion thereof is water-cooled. Therefore, the entire surface of the primary containment vessel is cooled so as to remove decay heat of the reactor for a long period. With this construction, the cooling of the primary containment vessel is effected through the steel wall having a large heat radiation area and a good heat transfer efficiency, and therefore the decay heat can be removed in a reliable and efficient manner. Further, since the upper portion of the primary containment vessel suited for the air-cooling and the lower portion thereof suited for the water-cooling are cooled respectively by the air-cooling and the water-cooling, the cooling efficiency is enhanced, and this cooling construction can be simplified.

BRIEF DESCRIPTION OF THE DRAWINGS

FIG. 2 is a graph showing a relation between a pressure variation in a reactor pressure vessel and the time period of supply of water into the reactor pressure vessel by each emergency core cooling system at the time of a coolant loss accident;

DESCRIPTION OF THE PREFERRED EMBODIMENTS

Preferred embodiments of the present invention will now be described with reference to the drawings.

Figure 1:
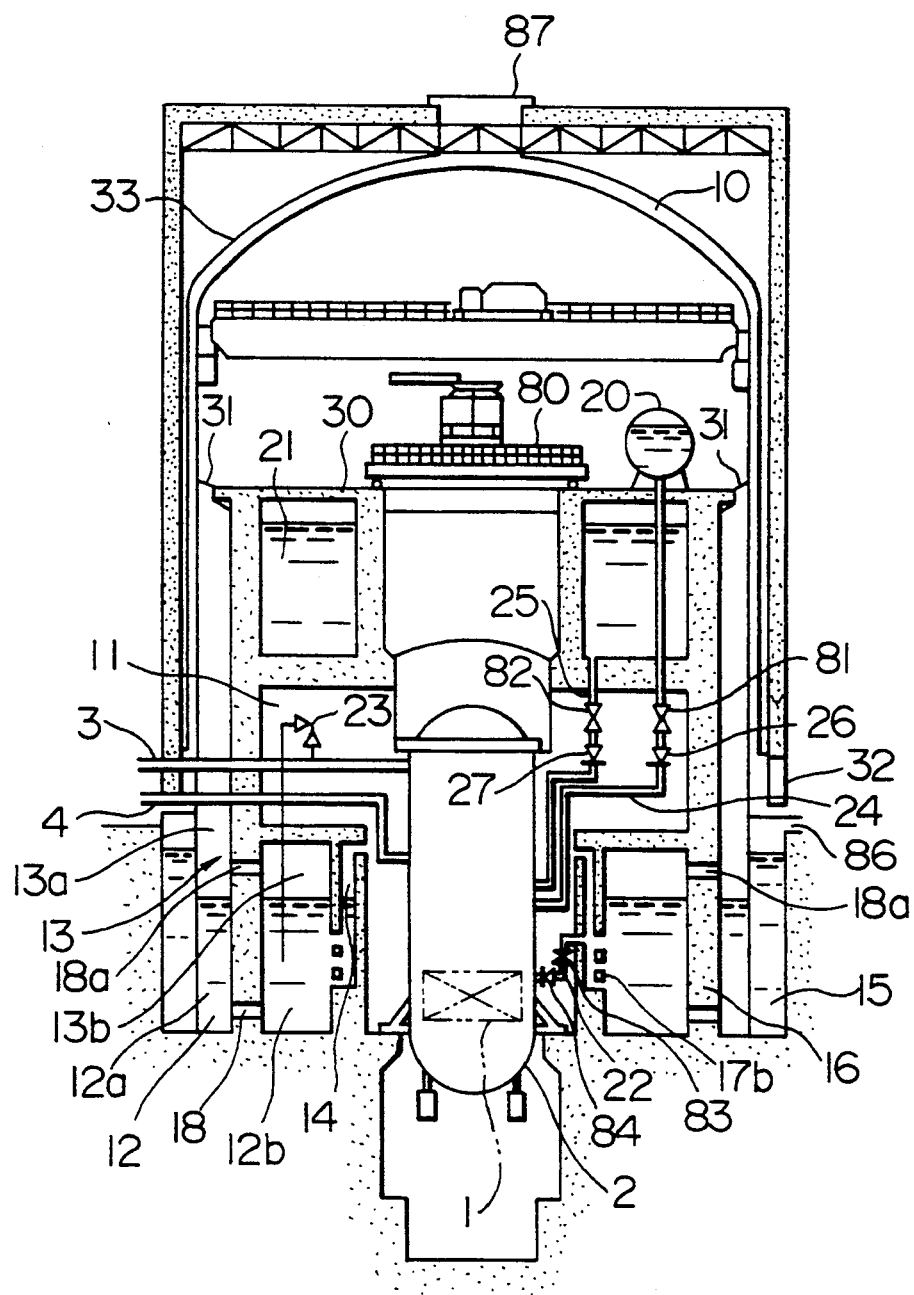
FIG. 1 is a vertical cross-sectional view of a nuclear reactor installation according to a first embodiment of the present invention.

FIG. 1 shows an example in which the present invention is applied to a boiling nuclear reactor having an electric output of 1,350 MW.

In FIG. 1, a cooling water pool 21, a dry well 11 and a pressure suppression pool 12 are formed by a concrete structural wall 16. An upper surface of the structure formed by the concrete structural wall 16 serves as an operation floor 30 where materials, such as nuclear fuel elements, contained in a reactor pressure vessel 2, are handled by a handling device 80.

The structure formed by the concrete structural wall 16 is covered with a primary containment vessel 10 of steel.

The reactor pressure vessel 2 is mounted in the dry well 11. A reactor core 1, composed of nuclear fuel, is contained in the reactor pressure vessel 2. Cooling water in the reactor pressure vessel 2 receives nuclear reaction heat from the reactor core 1 to be converted into steam of high temperature and pressure, and this steam is fed via a main steam line 3 to the exterior of the primary containment vessel 10 to be used as a drive source for a turbine or the like. The steam thus used as the drive source for the turbine is condensed, and is returned to the reactor pressure vessel 2 via a feed water line 4. Therefore, the main steam line 3 and the feed water line 4 are extended from the reactor pressure vessel 2 to the outside of the primary containment vessel 10.

The pressure suppression pool 12 and the dry well 11 are communicated with each other by a vent tube 14 having an inlet 17a and an outlet 17b. A wet well 13 which is a space above the suppression pool 12 is divided by the concrete structural wall 16 into an outer portion 13a made in contact with the primary containment vessel 10 and an inner portion 13b made not in contact with the wall of the primary containment vessel 10. A plurality of communication holes 18 are formed through that portion of the concrete structural wall 16 dividing the suppression pool 12 into an inner pool 12b and an outer pool 12a, and are disposed below the surface of the water in the suppression pool 12. The pool water can be circulated between the inner and outer pools 12b and 12a through the plurality of communication holes 18. Also, a plurality of communication holes 18a are formed through that portion of the concrete structural wall 16 dividing the suppression pool 12 into the inner and outer pools 12b and 12a, and are disposed above the surface of the water in the suppression pool 12.

An automatic depressurization system is provided in the dry well 11. This automatic depressurization system comprises an automatic depressurization valve 23 mounted on the main steam line 3, and a line or pipe is connected at its one end to a discharge port of the automatic depressurization valve 23, and the other end of this line is open into the pool water in the suppression pool 12. The automatic depressurization system also includes a control system which opens the automatic depressurization valve 23 when means for measuring the level of coolant water in the reactor pressure vessel 2 detects a low level dangerous for the reactor core 1.

A plurality of kinds of emergency core cooling systems are provided within the primary containment vessel 10.

More specifically, an accumulator-type emergency core cooling system comprises a pressure accumulator tank 20 mounted on the operation floor 30, a line 24 connected between the pressure accumulator tank 20 and the reactor pressure vessel 2, a check valve 26 mounted on the line 24 so as to prevent the flow toward the pressure accumulator tank 20, and a shut-off (closing and opening) valve 81 mounted on the line 24. Gas under pressure is applied to the interior of the pressure accumulator tank 20. This pressure is, for example, 3 MPa.

A gravity-driven emergency core cooling system comprises a cooling water pool 21, a line 25 connected between the cooling water pool 21 and the reactor pressure vessel 2, a check valve 27 mounted on the line 25 so as to prevent the flow toward the cooling water pool 21, and a shut-off valve 82 mounted on the line 25.

An equalizing system for submerging the reactor core comprises an equalizing line 22 connected between the suppression pool 12 and the reactor pressure vessel 2, a check valve 84 mounted on the line 22 so as to prevent the flow toward the suppression pool 12, and a shut-off valve 83 mounted on the line 22. The outlet of the equalizing line 22 communicated with the reactor pressure vessel 2 is disposed at a level slightly higher than the upper end of the reactor core 1.

Figure 14:
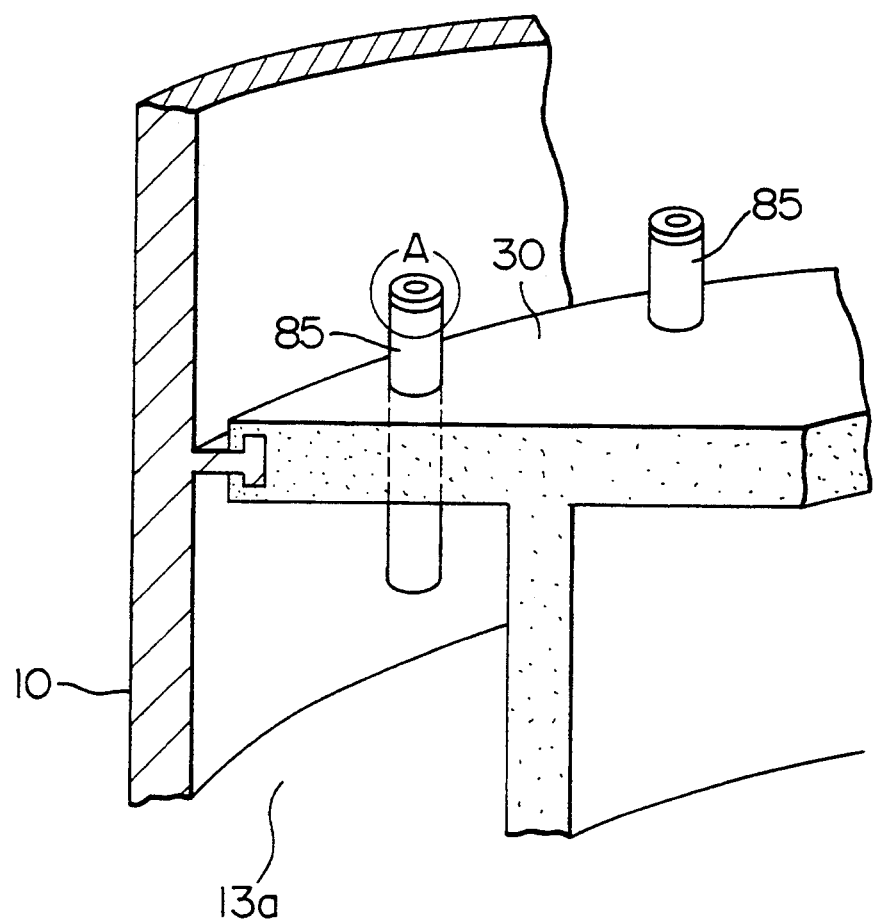
FIG. 14 is a perspective view of a portion of a boundary region between an operation floor of the reactor installation of the first embodiment and a wet well.
Figure 15:
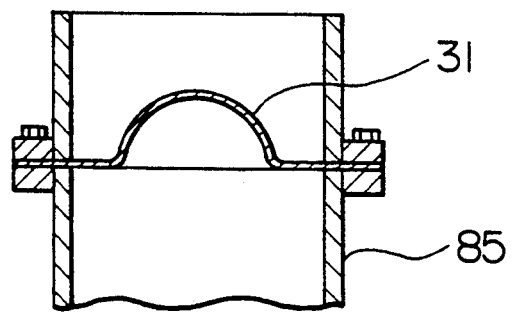
FIG. 15 is an enlarged, vertical cross-sectional view of a portion indicated by a circle A of FIG. 14.

As shown in FIG. 14, the upper wall portion of the concrete structural wall 16 is sealingly (air-tightly) connected to the inner peripheral surface of the primary containment vessel 10, so that the operation floor 30 is isolated from that region disposed below this upper wall portion. As shown in FIGS. 14 and 15, pipes 85 extends vertically through the concrete structural wall 16. As shown in FIG. 15, a rupture disk 31 is fixedly mounted on the upper portion of the pipe 85 to block the pipe 85. The rupture disk 31 has such a strength as to be ruptured by the pressure within the wet well 13 of the pressure suppression chamber to open the pipe 85, when this pressure is increased excessively at the time of an accident. Thus, the rupture disk 31 serves as opening and closing control means which is normally closed, and is opened by the excessive high pressure at the time of the accident.

The lower portion of the primary containment vessel 10 is immersed in an outer pool 15 disposed in contact with the outer periphery of the primary containment vessel 10. This outer pool is provided with a discharge port 86 opening to the exterior.

Figure 6:
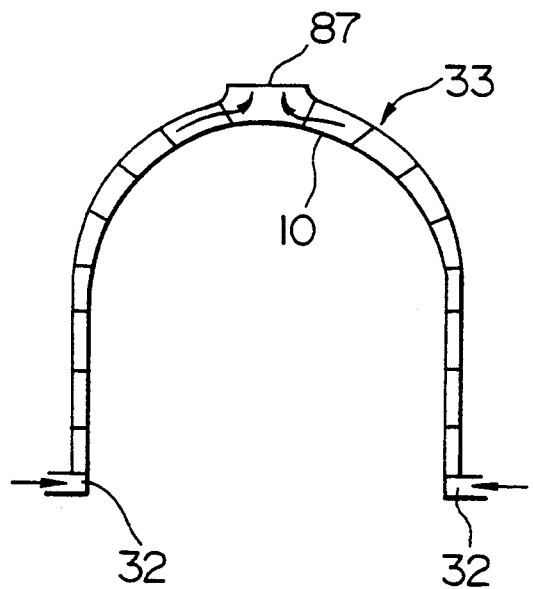
FIG. 6 is a schematic vertical cross-sectional view of an air-cooling duct in the reactor installation of the first embodiment.
Figure 7:
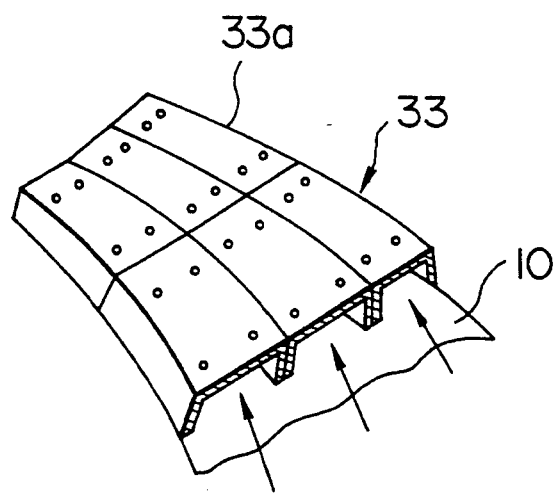
FIG. 7 is a perspective view of a portion of the air-cooling duct of FIG. 6.
Figure 16:
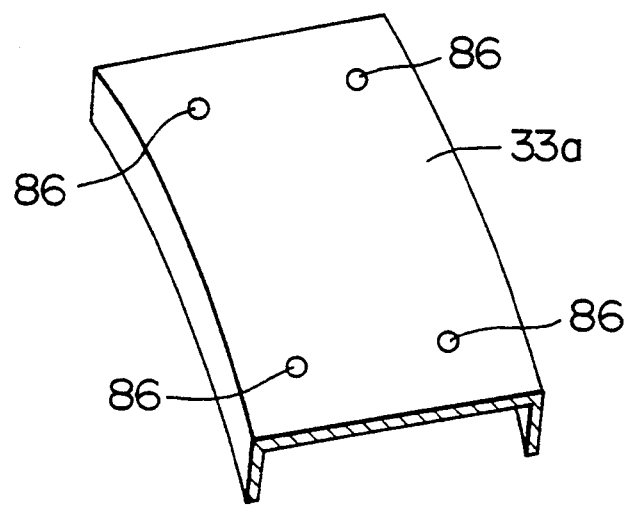
FIG. 16 is a perspective view of a constituent segment of the air-cooling duct used in each of the embodiments of the present invention.
Figure 17:
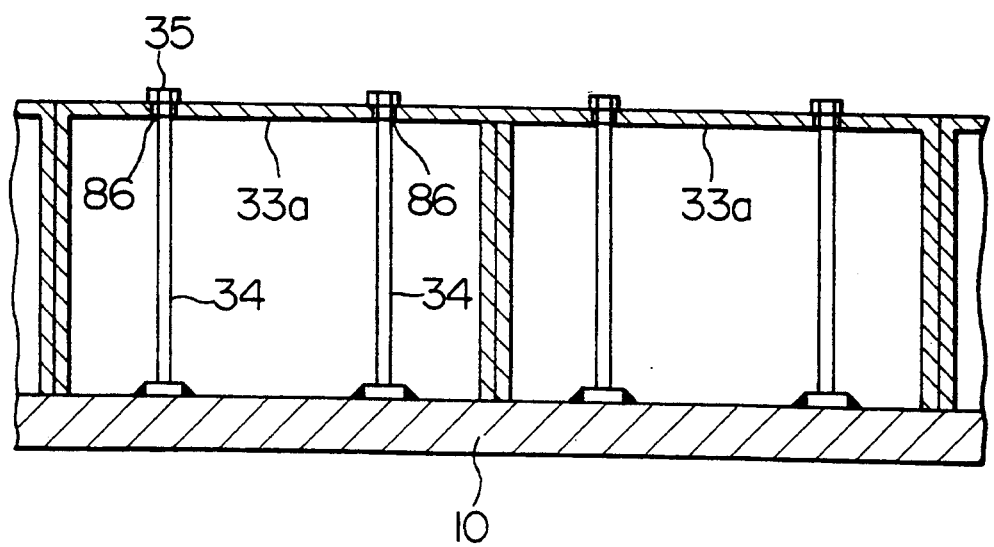
FIG. 17 is a cross-sectional view showing the manner of mounting of the segments of FIG. 16 on the primary containment vessel.

An air-cooling duct 33 is mounted on that portion of the primary containment vessel 10 which is disposed above the outer pool 15. As shown in FIGS. 6 and 7, the air-cooling duct 33 is constituted by a number of segments 33a of a channel-shaped cross-section mounted on the outer surface of the primary containment vessel 10 so as to form continuous flow passages extending in an up-down direction. As shown in FIGS. 16 and 17, for mounting the segments 33a, bolts 34 are fixedly secured to the outer surface of the primary containment vessel 10 by welding, and the bolts 34 are passed respectively through holes 86 formed through the segments 33a, and nuts 35 are attached respectively to the bolts 34 to fix the segments 33a. An air intake port 32 is provided at the lower end of the air-cooling duct 33, and an air discharge port 87 is provided at the upper portion of the air-cooling duct 33.

The air-cooling duct 33 is covered with a reactor building 88 except for the air intake port 32 and the air discharge port 87.

In the above nuclear reactor installation, the operation of the reactor is started, and then after the pressure within the reactor pressure vessel 2 reaches a normal operating pressure, the shut-off valves 81, 82 and 83 are opened.

If there occurs a coolant loss accident caused, for example, by a breakage of the main steam line 3 during the normal operating condition of the reactor, the steam of high temperature and pressure within the reactor pressure vessel 2 flows from a broken portion to the dry well 11. Since the amount of the cooling water in the reactor pressure vessel 2 decreases due to the breakage of the line, the ability to cool the reactor core 1 is lowered.

When a decrease of the level of the cooling water in the reactor pressure vessel 2, caused by an accident is detected, the automatic depressurization valve 23, mounted on the main steam line 3, is operated to allow the steam within the reactor pressure vessel 2 to flow into the suppression pool 12 after insertion of control rods (which are not shown) into the nuclear reactor core for ceasing the reaction of nuclear fission, thereby promoting the decrease of the pressure within the reactor pressure vessel 2.

The pressure within the reactor pressure vessel 2 is decreased by the operation of the automatic depressurization valve 23 to a level lower than the pressure of the pressure accumulator tank 20, and the check valve 26 is opened. At this time, the cooling water in the pressure accumulator tank 20 is supplied under pressure into the reactor pressure vessel 2, so that the reactor core 1 is cooled.

Thereafter, before all of the cooling water in the pressure accumulator tank 20 is supplied, the pressure within the reactor pressure vessel 2 becomes lower than the pressure due to a static head difference between the cooling water pool 21 and the reactor pressure vessel 2, so that the check valve 27 is opened, and as a result the cooling water in the cooling water pool 21 is supplied by gravity into the reactor pressure vessel 2 via the line 25.

A large amount of cooling water held by the cooling water pool 21 submerges the reactor core 1, and then overflows from the broken portion of the line, and fills in the lower portion of the dry well 11 disposed at the lower portion of the reactor pressure vessel 2. Then, when the level of the cooling water filled in the lower portion of the dry well 11 rises to the upper end of the vent tube 14, this cooling water flows into the suppression pool 12 to increase the level of the water of this pool 12.

The level of the water in the suppression pool 12 is thus increased by the cooling water from the cooling water pool 12, and therefore a static head difference develops between the suppression pool 12 and the reactor core 1. Due to this static head difference, the water in the suppression pool 12 is supplied into the reactor pressure vessel 2 via the equalizing line 22. The water supplied into the reactor pressure vessel 2 receives the decay heat to evaporate, and the steam resulting from the evaporated water is fed to the suppression pool 12 via the ruptured portion of the line and the automatic depressurization valve 23, and is condensed into water. The condensation water is again supplied into the reactor pressure vessel 2 via the equalizing line 22, and is thus circulated.

FIG. 2 shows, by way of example, variations of the pressure within the reactor pressure vessel 2 after the accident, and also shows the functions of the three lines of emergency core cooling systems (hereinafter referred to as "ECCS"). The pressure within the reactor pressure vessel 2 is lowered by the operation of the automatic depressurization valve 23, so that the cooling water held by the ECCS can be supplied into the reactor pressure vessel 2.

First, in order to prevent the reactor core 1 from being exposed from the cooling water in the reactor pressure vessel 2, the accumulator-type ECCS supplies the cooling water from the pressure accumulator tank 20 by the pressure difference between the pressure accumulator tank 20 and the reactor pressure vessel 1 at a stage about 150 seconds after the accident at which stage the pressure in the reactor pressure vessel 2 is still maintained at a high level.

Thereafter, the pressure in the reactor pressure vessel 2 is further decreased since the automatic depressurization valve 23 is in its open condition. Therefore, the gravity-driven ECCS, which supplies the cooling water due to the static head difference based on the difference in level between the cooling water pool 21 and the reactor pressure vessel 2, is operated. At this time, in order to avoid the situation that the supply of the cooling water is interrupted when the supply of the cooling water is switched from the accumulator-type ECCS to the gravity-driven ECCS, an effective static head pressure of the cooling water pool 21 is set so that the operation of the gravity-driven ECCS can be started in accordance with the pressure in the reactor pressure vessel 2 immediately before completion of the supply of the cooling water fed by the accumulator-type ECCS.

Therefore, in order to prevent the reactor core 1 from being exposed immediately after the accident, the accumulator-type ECCS operable under high pressure needs only to operate until the gravity-driven ECCS begins to operate. Therefore, the pressure accumulator tank 20 may have a relatively small capacity for holding the cooling water.

On the other hand, the gravity-driven ECCS operates under low pressure, and does not require pressurization, and therefore this ECCS can have a relatively large capacity for holding the cooling water. After the reactor core 1 is submerged by the cooling water supplied from the gravity-driven ECCS, the cooling water overflows from the broken portion of the line and the automatic depressurization valve 23, and is filled in the lower portion of the dry well 11 disposed at the lower portion of the reactor pressure vessel 2. When the water level further rises to the upper end of the vent tube 14, the cooling water flows into the suppression pool 12 to increase the water level thereof.

Figure 3A:
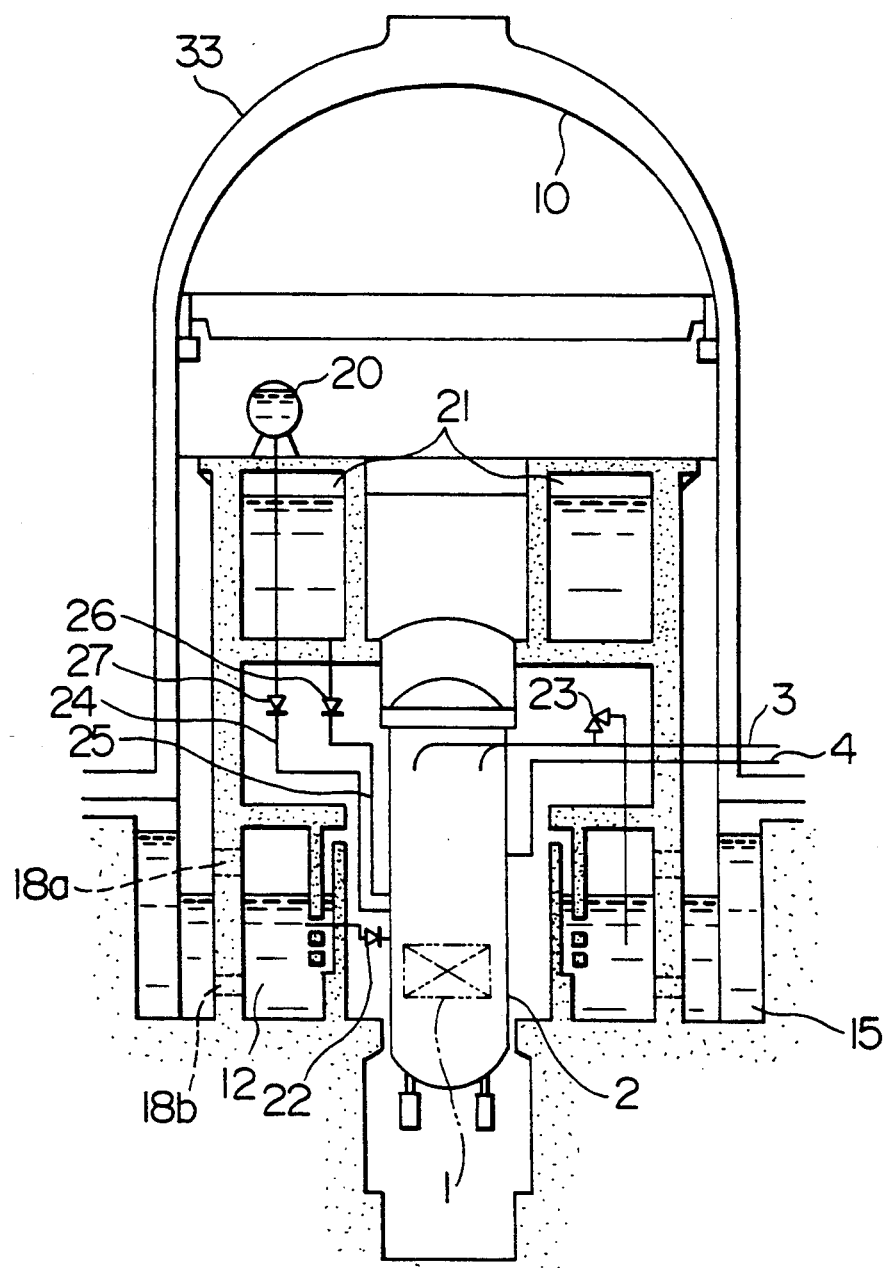
FIG. 3a is a schematic vertical cross-sectional view of the reactor installation of the first embodiment, showing a water holding condition of each emergency core cooling system (ECCS) in a normal operating condition of the first embodiment.
Figure 3B:
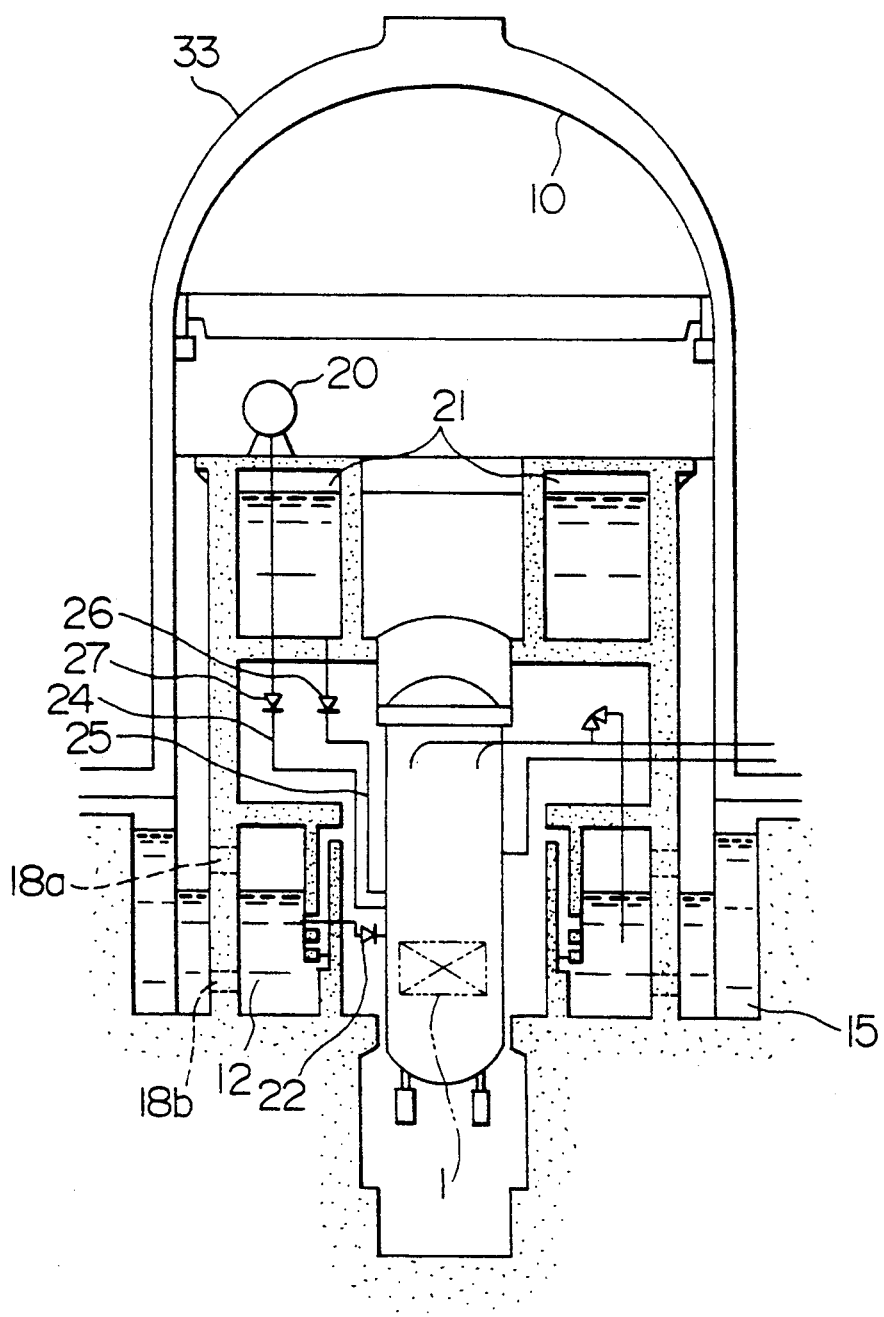
FIG. 3b is a view similar to FIG. 3a, but showing a water holding condition of each emergency core cooling system after an accumulator-type ECCS is operated at the time of a coolant loss accident of the first embodiment.
Figure 3C:
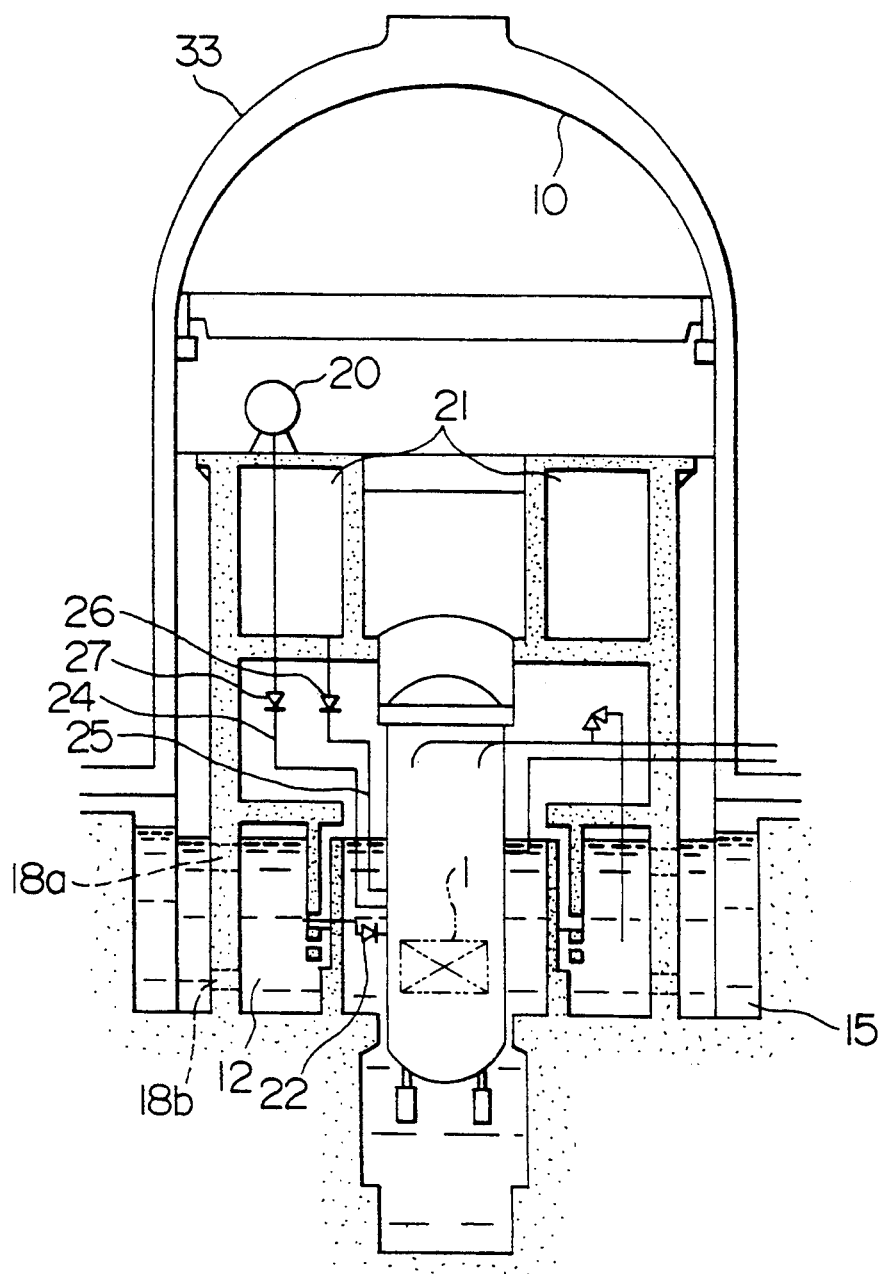
FIG. 3c is a view similar to FIG. 3a, but showing a water holding condition of each emergency core cooling system after a gravity-driven ECCS is operated at the time of the coolant loss accident of the first embodiment.

FIGS. 3a to 3c show the operations of the three ECCSs after the accident.

FIG. 3a is a cross-sectional view showing the water-holding conditions of the ECCSs during the normal operating condition.

When the coolant loss accident occurs, a plant control system detects a decrease of the water level of the reactor. A safety valve is opened by the operation signal from the automatic depressurization system (relief safety valve) 23 to decrease the pressure in the reactor as shown in FIG. 2. Thereafter, at the time (about 140 seconds in FIG. 2) when the pressure within the reactor goes below the operation pressure (3 MPa) of the accumulator-type ECCS 20, the check valve 27 is opened, so that the water held by the accumulator-type ECCS 20 is supplied to the reactor core 1 via the line 24. The accumulator-type ECCS 20 can supply the water under high pressure to prevent the core 1 from being exposed at the time when the pressure in the reactor is high, and this ECCS has a relatively small capacity for holding the cooling water.

FIG. 3b shows the water-holding conditions at a stage (at about 450 seconds in FIG. 2) when the supply of the water from the accumulator-type ECCS is finished.

The operation of the automatic depressurization system 23 further continues, and when the pressure in the reactor decreases to about 0.3 MPa, the static head difference (=about 20 m in terms of the height difference; which is given such a formula as $\rho \times g \times H$, where $\rho$ is the density of water, g is the gravitational acceleration and H is the height difference) between the pool 21 of the gravity-driven ECCS and the reactor core 1 becomes larger than the pressure in the reactor, and therefore the check valve 26 is opened, and the water held by the pool 21 of the gravity-driven ECCS is supplied to the reactor core 1 via the line 25.

The gravity-driven ECCS can supply the cooling water when the pressure in the reactor becomes low, and this ECCS holds a large amount of water because of the low pressure.

This large amount of water, after being supplied to the reactor core 1, overflows from the broken portion of the line and other portion to fill in the lower portion of the dry well 11 disposed at the lower portion of the reactor pressure vessel 2, and further flows into the suppression pool 12 via the vent tube 14 to increase the water level of the suppression pool 12.

FIG. 3c shows the condition (at about 900 seconds in FIG. 2) after the supply of the cooling water by the gravity-driven ECCS is finished so that the water level of the suppression pool 12 is increased.

At a stage later than the stage of FIG. 3c, the static head difference between the suppression pool 12 and the reactor core 1 becomes larger than the pressure in the reactor, and the cooling water is supplied from the suppression pool 12 to the core 1 via the equalizing line 22.

The supplied cooling water evaporates at the reactor core 1, but flows again into the suppression pool 12 via the broken portion and the vent tube 14, and is condensed there. Therefore, the amount of the cooling water held by the suppression pool 12 is not changed, thereby achieving the cooling of the core 1 for a long period of time.

The upper spaces of the inner and outer portions (pools) 12b and 12a of the suppression pool 12 are communicated with each other by the communication holes 18a, and therefore the pressure in the upper space of the inner portion 12b will not be increased by the increasing water level thereof and the steam fed from the reactor core 1. Therefore, the increase of the water level of the suppression pool 12 during the operation of the gravity-driven ECCS is not hindered.

Also, since the water level of the suppression pool 12 is increased, the area of contact of the outer portion 12a with the wall of the primary containment vessel 10 of steel is increased, and hence the area of contact between the suppression pool 12 and the outer pool 15 via the wall of the steel primary containment vessel 10 for heat transfer purposes is increased. Therefore, the cooling effect is enhanced, and the long-period cooling effect for the decay heat from the reactor core 1 is markedly enhanced.

With the above construction, without any replenishment water from the exterior, a smooth shift from the cooling of the core by the ECCSs to the long-period cooling for removing the decay heat from the primary containment vessel can be effected smoothly.

In view of the amount of the water necessary for ensuring the static head difference between the suppression pool 12 and the reactor core 1 so as to supply the cooling water to the core 1 via the equalizing line 22 in order to avoid the interruption of the cooling of the core 1 when the supply of the cooling water is switched from the gravity-driven ECCS to the equalizing system after the total amount of the water of the gravity-driven ECCS is supplied, and also in view of the amount of the water necessary for cooling the core 1, and further in view of the amount of the water necessary for filling in the lower portion of the dry well 11 (which is disposed at the lower portion of the reactor pressure vessel 2) up to the upper end of the vent tube 14, the amount of the water held by the gravity-driven ECCS is determined. The gravity-driven ECCS serves to fill the lower portion of the dry well 11 with the cooling water up to the upper end of the vent tube 14 to increase the water level of the suppression pool 12, and is required only to function until the equalizing system begins to operate.

None of these three ECCSs use any powered device such as a motor driven pump, and they operate in accordance with the passive principle such as the pressure difference or the static head difference relative to the pressure within the reactor pressure vessel 2. The operation of these ECCSs dose not require the manipulation by the operator in the reactor plant. That is, it is automatically started so as to continuously cool the reactor core in accordance with the pressure in the reactor after the accident, throughout all stages, that is, the high-pressure stage, the low-pressure stage and the long-period cooling stage. These ECCSs function to effect a long-period cooling of the core 1 without the need for replenish water from the exterior.

Therefore, a wrong manipulation by the operator as well as factors in the malfunction of the equipment can be eliminated, there by enhancing the reliability of the plant.

Since the functions are allotted to the three ECCSs, and since a large-capacity design of the cooling system equipment can be avoided, it is possible to attain a smaller-size construction of the primary containment vessel 10 having the ECCSs mounted therein.

The lower portion of the dry well 11 is filled with the cooling water from the gravity-driven ECCS up to the upper end of the vent tube 14. With this arrangement, even if an extraordinarily serious core-melting accident which has not been experienced, should occur so that the melted core 1 Passes through the reactor pressure vessel 2 and drops to the primary containment vessel 10, the soundness of the primary containment vessel 10 can be ensured since the lower portion of the dry well 11 is filled with the cooling water up to the upper end of the vent tube 14, thereby enhancing the safety of the plant.

Further, all of the component parts of the above three ECCS, including the reservoir means for holding the cooling water, the lines and the valves, are mounted within the primary containment vessel 10 made of steel, and therefore even if an accident should occur on the part of the ECCS for a certain reason, the radio-activated cooling water will not be discharged to the exterior of the primary containment vessel 10, thereby enhancing the safety of the nuclear plant.

The cooling of the reactor core 1 is achieved by the above-mentioned three ECCSs, and subsequently the decay heat accumulated in the suppression pool 12 is removed by the cooling system provided for the primary containment vessel 10.

As the cooling system 10 for the primary containment vessel 10, explanation will be hereinbelow made of an embodiment having an external pool system that is provided around the outer periphery of the primary containment vessel 10 and a cooling air system of a natural draft type that is provided around the outer periphery of that portion of the primary containment vessel 10 which is above the wet well 13, corresponding to the space of the operation floor 30 and including cooling ducts 33.

In the event of a coolant loss accident, the steam, resulting from the water subjected to the decay heat in the reactor pressure vessel 2, flows into the dry well 11 through a broken portion of the line, so that the pressure in the dry well 11 increases. When the pressure in the dry well 11 increases, the water level of the vent tube 14 is lowered by this pressure. Then, when this water level becomes lower than the level of the outlet 17b of the vent tube 14, the steam and non-condensable gas (nitrogen) in the dry well 11 flow into the suppression pool 12 through the vent tube 14.

The steam thus fed into the suppression pool 12 is condensed in the water of this pool to discharge the latent heat, and the temperature of the water in the suppression pool 12 is increased by this heat.

On the other hand, the non-condensable gas in the dry well is accumulated in the wet well 13 which is a gas phase space above the pressure suppression chamber.

In order to maintain the soundness of the primary containment vessel 10, it is necessary to cool the pressure suppression chamber to keep the maximum pressure of the primary containment vessel 10 to below an allowable design pressure. In the primary containment vessel 10 of the present invention, the suppression pool 12 is provided around the reactor pressure vessel 2, and therefore the wet well 13 serves as the boundary of the containment vessel so that the maximum pressure of the wet well 13 is suppressed.

The pressure of the wet well 13 at the time of an accident is generally expressed by the following formula although it may vary depending on the shape and size of the primary containment vessel 10, the heat removal type and the boundary conditions:

$$P = P_{steam} + P_{ncgas}$$

where $P_{steam}$ represents a partial pressure of the steam, and $P_{ncgas}$ is a partial pressure of the non-condensable gas. Therefore, the suppression of the maximum pressure of the wet well 13 is achieved by reducing these partial pressures.

The steam partial pressure in the wet well 13 is a saturated steam pressure determined by the temperature of the water in the suppression pool 12, and therefore by cooling the suppression pool 12 to lower the temperature of the pool water, the steam partial pressure can be reduced.

In order to cool the suppression pool 12, the outer pool 15 is provided outside the primary containment vessel 10.

As a result of a temperature rise of the suppression pool 12, a temperature difference develops between the outer pool 15 and the suppression pool 12, and therefore the heat is transferred from the suppression pool 12 to the outer pool 15 through the steel wall of the primary containment vessel 10. As a result, the temperature of the water in the outer pool 15 also rises, and finally the evaporation steam resulting from the water of the outer pool 15 is discharged to the exterior through the discharge port 86, thereby discharging the decay heat to the exterior of the primary containment vessel 10.

On the other hand, the water in the suppression pool 12 is subjected to a natural convection because of the heating by the latent heat due to the condensation of the steam and of the cooling of the wall of the primary containment vessel 10, and also the water in the outer pool 15 is subjected to a natural convection because of the heating through the wall of the primary containment vessel 10. With this arrangement, without the use of a motor driven pump and a heat exchanger, the decay heat can be discharged to the exterior of the primary containment vessel 10, utilizing the natural convection heat transfer in which the wall of the primary containment vessel 10 is used as a heat transfer surface.

The temperature of the water in the suppression pool 12 depends on the amount of the accumulated heat obtained by subtracting the amount of heat radiation to the outer pool 15 from the decay heat produced from the reactor core 1, and therefore the steam partial pressure can be reduced by increasing the amount of heat radiation to the outer pool. This heat radiation amount is expressed by the following formula:

$$Q = KA(T_{sp} - T_{op})$$

where K represents the overall heat transfer coefficient determined by the natural convection thermal conductivity coefficient of the pool and the thermal conductivity coefficient of the wall of the primary containment vessel 10, A represents the heat transfer area determined by the diameter of the primary containment vessel 10 and the depth of the pool water, $T_{sp}$ represents the temperature of the water in the suppression pool 12, and $T_{op}$ represents the temperature of the water in the outer pool 15.

Figure 4A:
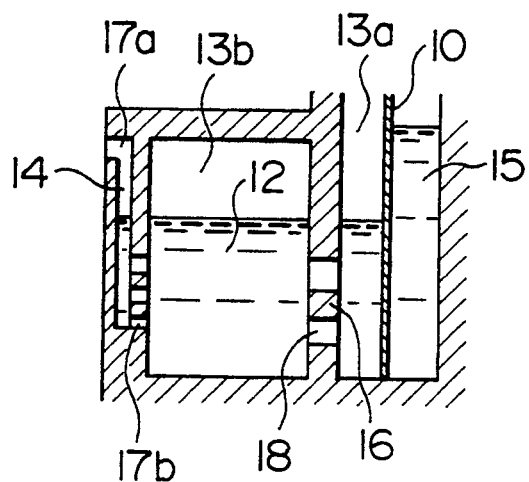
FIG. 4 is a vertical cross-sectional view of a pressure suppression pool in a modified form of the first embodiment of the invention in a normal operating condition.
FIG. 4b is a view similar to FIG. 4a, but showing a condition at an initial stage after an accident in the modified form.
FIG. 4c is a view similar to FIG. 4a, but showing a condition at a further stage of the accident from the condition of FIG. 4b.
Figure 4B:
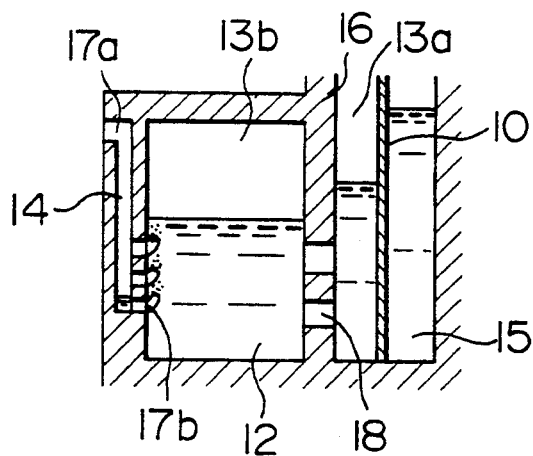

In order to increase the amount of heat radiation to the outer pool 15, it is necessary to increase the heat transfer area. In order to deal with a pool swell phenomenon in which the liquid surface of the suppression pool 12 is abruptly raised by a large amount of gas (which is produced during blow-down immediately after the occurrence of the accident) introduced into the suppression pool 12, the water level of the suppression pool 12 is kept low during the normal operating condition, as shown in FIG. 4a, so as to prevent a large impact load from acting on the concrete structural wall 16. However, after the accident, the cooling water from the gravity-driven ECCS flows into the suppression pool 12 via the vent tube 14, and therefore the condition shown in FIG. 4b is obtained, and then the water level of the suppression pool 12 can be raised at the time of the long-period cooling stage, as shown in FIG. 3c. Therefore, the area of heat radiation to the outer pool 15 can be increased, thereby enhancing the heat radiation characteristics.

Figure 3D:
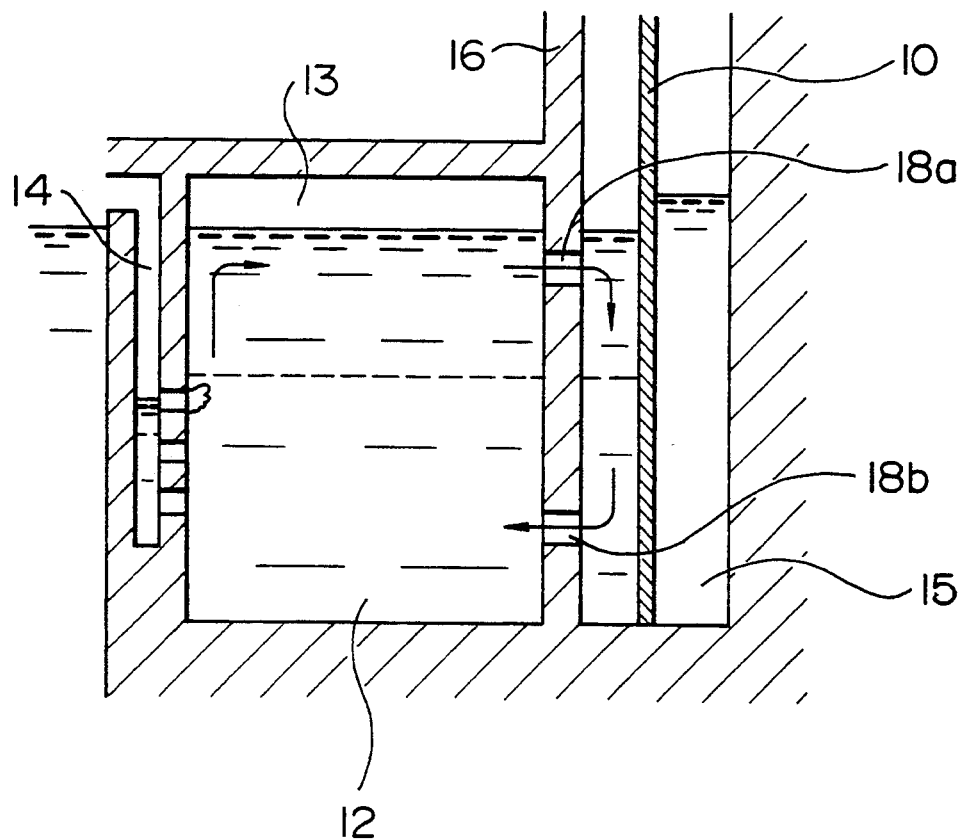
FIG. 3d is an enlarged view of a portion of FIG. 3c.

FIG. 3d is an enlarged view of a portion of FIG. 3c, showing the condition in which the water level of the suppression pool 12 is increased so as to be higher than its normal water level (indicated by a broken line) by the overflow water from the gravity-driven ECCS (the water cooling pool 21). More specifically, the water level rises above the communication holes 18a.

Thanks to the provision of the upper and lower communication holes in the structural wall 16, a temperature stratification phenomenon (mentioned below) in the suppression pool 12 is alleviated, so that the high-temperature region used for radiating the heat to the outer pool 15 can be increased. Arrows in FIG. 3d indicate the convention phenomenon through the communication holes 18 and 18a.

As is already known, that the water in the portion of the suppression chamber 12 above the outlet of the vent tube 14 is subjected to high temperature because of the steam condensation whereas the temperature of the pool water below the outlet of the vent tube 14 is kept low. This is called the temperature stratification phenomenon. However, when the upper and lower communication holes are provided as in this embodiment, the high-temperature water at the upper portion of the suppression pool 12 flows through the upper communication holes 18a to the outside of the structural wall 16 because of the natural convection, and is cooled by the outer pool 15. Then, the pool water descends along the wall of the primary containment vessel 10, and flows again to the inside of the structural wall 16 through the lower communication holes 18, so that the temperature of the lower pool water can be increased. The amount of radiation of the heat to the outer pool 15 is proportional to the area of heat radiation between the suppression pool 12 and the outer pool 15, and therefore the high-temperature region effective for the radiation of the heat to the outer pool 15 can be extended to below the outlet of the vent hole 14 because of the provision of the upper and lower communication holes, as described above.

The thermal capacity of the suppression pool 12 is increased as a result of rising the water level of the suppression pool 12 by the overflow water from the gravity-driven ECCS 21, and therefore the temperature rise of the suppression pool 12 upon removal of the decay heat is suppressed, and consequently the effect of suppressing the pressure in the primary containment vessel 10 is much enhanced.

Figure 4C:
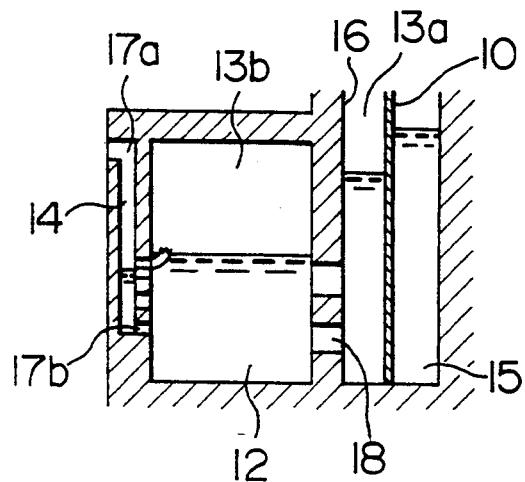

In the above-mentioned embodiment, the communication holes 18a formed through the structural wall 16 are disposed above the normal water level of the suppression pool 12. The type of construction in which such communication holes 18a are disposed below the normal water level of the suppression pool 12 will now be described with reference to FIGS. 4a to 4c.

In this embodiment, the wet well 13 is divided by the concrete structural wall 16 into the inner portion 13b and the outer portion 13a, and therefore the non-condensable gas is accumulated in the inner portion 13b of the wet well 13. With this arrangement, the partial pressure of the nitrogen in the inner portion 13b is higher than the partial pressure of the nitrogen in the outer portion 13a, and the water levels of the inner pools 12b and outer pool 12a differ from each other in accordance with the pressure difference between the inner portion 13b and the outer portion 13a, that is, the water level of the outer pool 12a is higher than that of the inner pool 12b, as shown in FIG. 4a. As a result, the area of contact of the water of the suppression pool 12 with the inner peripheral surface of the primary containment vessel 10 is increased, thus increasing the effective area of heat transfer to the outer pool 15.

The partial pressure of the non-condensable gas is determined by the volume ratio of the dry well 11 and the wet well 13, and at the time of the accident, the space of the operation floor 30 is communicated with the space of the wet well 13 so as to increase the capacity for accommodating the non-condensable gas, thereby decreasing the non-condensable gas partial pressure.

Figure 5:
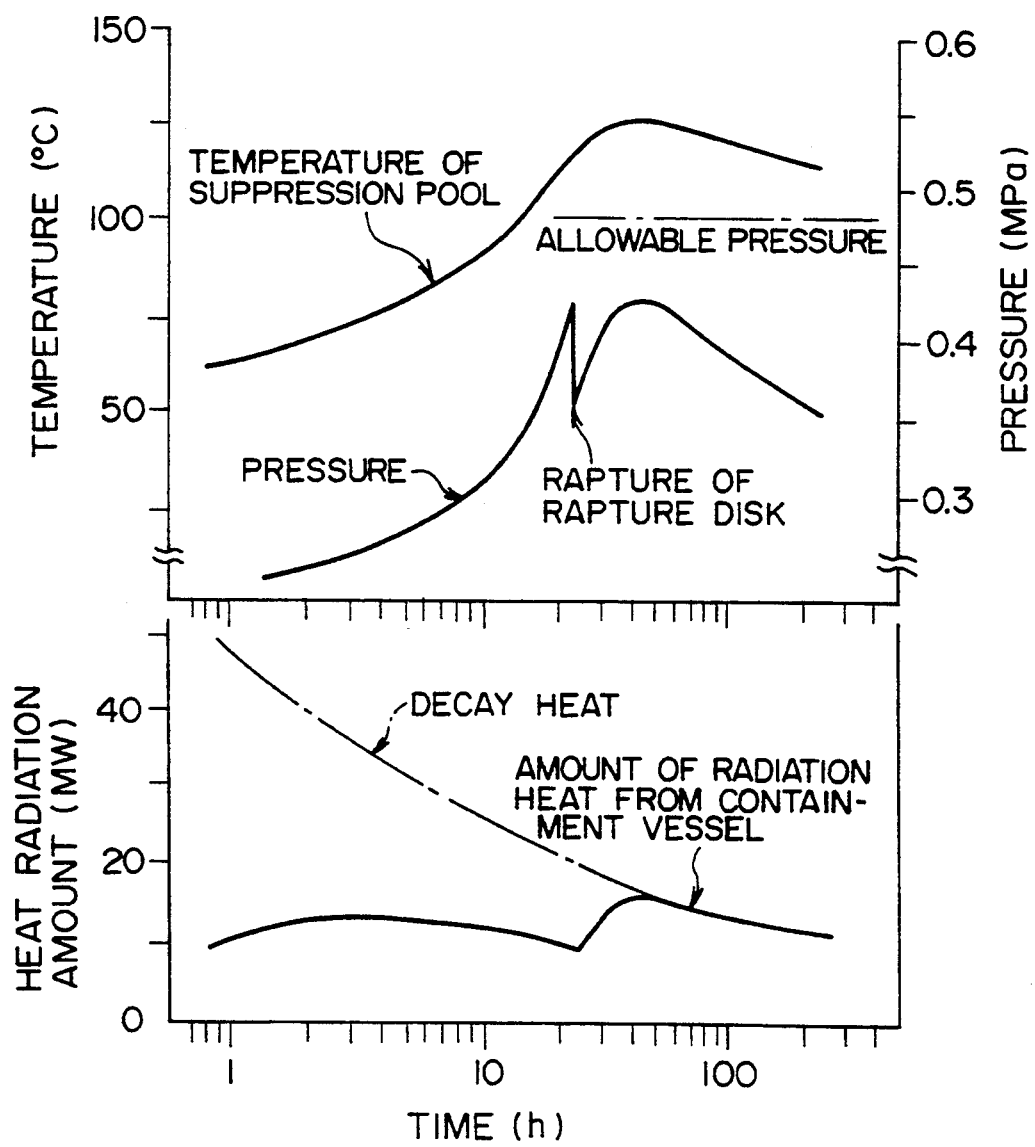
FIG. 5 is a graph showing heat radiation characteristics of the primary containment vessel cooling systems in the first embodiment, using a common time axis.

FIG. 5 shows one example of heat radiation characteristics of the cooling system of the primary containment vessel 10. Up to a stage of about 20 hours after the accident, the radiated or released heat from the outer pool 15 is smaller than the decay heat produced at the reactor core 1, and therefore the temperature of the suppression pool 12 rises, and the pressure of the wet well 13 is increased.

When the pressure of the wet well 13 exceeds the operating pressure for destroying the rupture disk 31 the rupture disk 31 is ruptured, so that the wet well 13 is communicated with the space above the operation floor 30 in the primary containment vessel 10. As a result, the non-condensable gas accumulated in the wet well 13 is allowed to flow into the space of the operation floor 30. Thus, the volume of the space of the operation floor 30 can be used as a part of the volume of the wet well 13. Therefore, the volume of the wet well 13 is virtually increased, so that the pressure in the primary containment vessel 10 is abruptly lowered.

Also, the non-condensable gas led into the space of the operation floor 30 has become high in temperature during the passage thereof through the suppression pool 12. Since the non-condensable gas, having flown into the space of the operation floor 30, has a high temperature, this gas move upward to heat the inner surface of the primary containment vessel 10 above the operation floor 30. Due to this heating, the gas in the air-cooling duct 33 in contact with the outer surface of the primary containment vessel 10 is heated. The heated gas in the air-cooling duct 33 is discharged from the outlet 87 of the air-cooling duct 33 to the exterior, and instead a fresh supply of cold air is drawn into the air-cooling duct 33 from its air intake port 32, thereby cooling the primary containment vessel 10 by a natural draft air cooling.

As shown in FIG. 6, the air-cooling duct 33 is provided on the outer periphery of the primary containment vessel 10, and in order to enhance the heat radiation by the natural draft air cooling, it is necessary to increase the velocity of the air moving upward in the air-cooling duct 33. For this reason, the gap between the air-cooling duct 33 and the outer peripheral surface of the primary containment vessel 10 is limited to about 20 cm to about 30 cm.

After the rupture disk 31 is ruptured, the natural draft air cooling by the air-cooling duct provided on the outer periphery of the primary containment vessel 10 can be also used, and therefore the amount of heat radiation from the primary containment vessel 10 is increased. By using the water-cooling through the outer pool 15 in combination with the air-cooling by the air-cooling duct 33, from a stage of about 50 hours after the accident, the amount of radiated heat (released heat) exceeds the decay heat, and the pressure in the primary containment vessel 10 and the temperature of the water of the suppression pool 12 decrease with the lapse of time.

As described above, there is provided the outer pool system in which, using the cooling water from the ECCSs and the wet well structure divided by the concrete structural wall 16, the water level of the suppression pool 12 is raised to increase the effective heat transfer area. Also, there is provided the primary containment vessel 10 of the type in which at the time of the accident, the wet well 13 can be communicated with the space of the operation floor 30 by destroying the rupture disk 31 so as to increase the volume of the wet well 13. Further, there is provided the air-cooling system for air-cooling the wall of the primary containment vessel 10 in contact with the wet well 13. With these arrangements, the temperature rise and the pressure rise in the primary containment vessel 10 can be efficiently suppressed.

Figure 8:
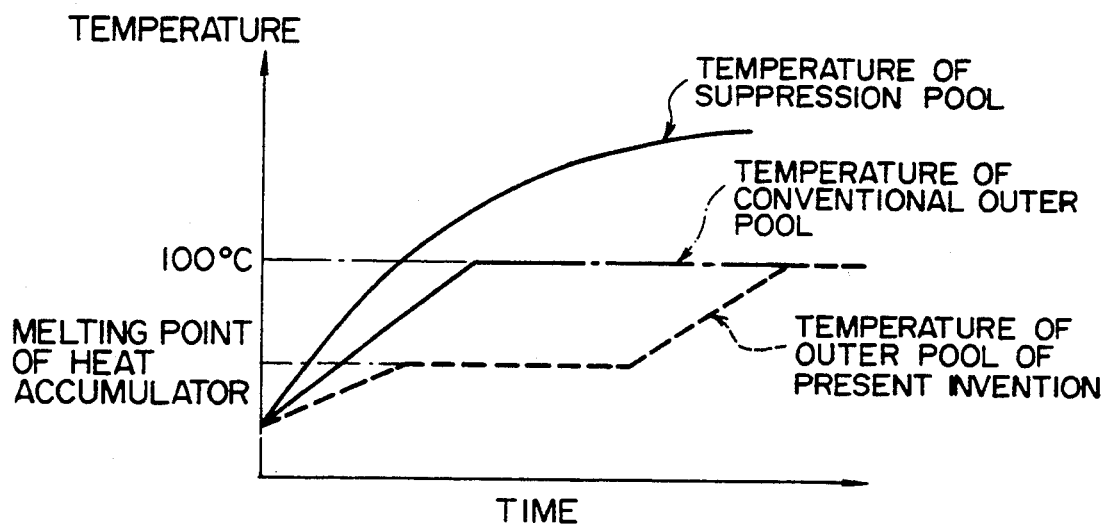
FIG. 8 is a graph showing a temperature variation of water in an outer pool in a nuclear reactor installation according to a second embodiment of the present invention.
Figure 9:
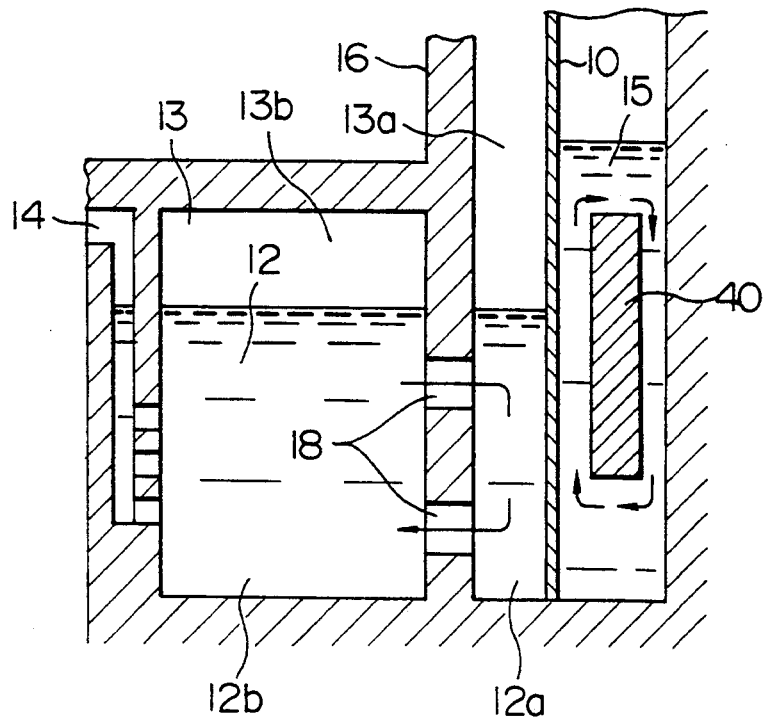
FIG. 9 is a vertical cross-sectional view of the outer pool of the reactor installation of the second embodiment.

A second embodiment of the present invention is shown in FIG. 9. This embodiment differs from the first embodiment of FIG. 1 in that a heat accumulator 40 having a melting point of not more than 100° C. is provided in an outer pool 15. As shown in FIG. 8, due to the radiation of heat from a suppression pool 12 to the outer pool 15, the temperature of the water of the outer pool 15 rises together with the temperature of the heat accumulator 40; however, the temperature rise of the water of the outer pool 15 is suppressed by the melting heat of the heat accumulator 40, and the temperature of the water of the outer pool 15 can be kept constant near the melting point of the heat accumulator 40, as shown in FIG. 8. Therefore, the temperature difference between the outer pool 15 and the continuously-heated suppression pool 12 becomes greater, so that the heat radiation characteristics are enhanced. Also, since the temperature rise of the outer pool 15 is suppressed, the time required for the pool water to evaporate becomes longer, and a walk-away period (which is a time period necessary for securing external replenishment water to be fed to the outer pool 15) can be prolonged, and therefore the burden on the operator can be alleviated. The other portions of the nuclear reactor installation of this embodiment are the same as those of the preceding embodiment, and therefore explanation thereof is omitted.

Figure 10:
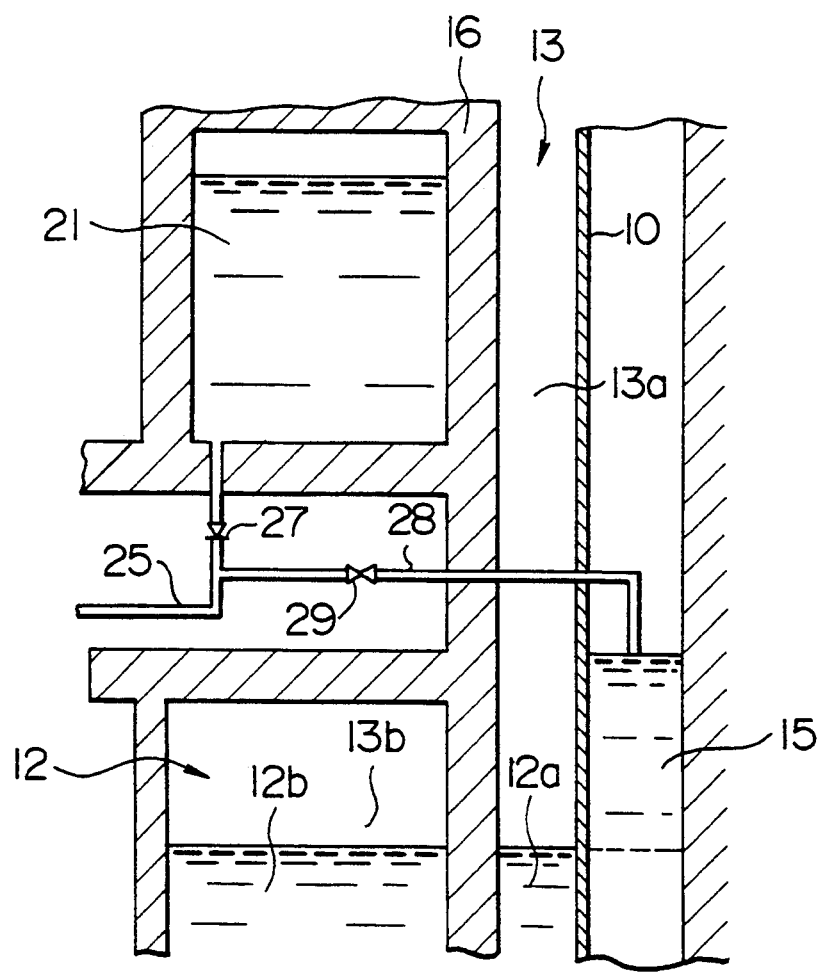
FIG. 10 is a vertical cross-sectional view of a nuclear reactor installation according to a third embodiment of the present invention, showing a portion thereof in the vicinity of an outer pool.

FIG. 10 shows a third embodiment of the present invention. This embodiment differs from the embodiment of FIG. 1 in that a branch line 28 is connected to a line 25 connected between a cooling water pool 21 of a gravity-driven ECCS and a reactor pressure vessel 2 and that a shut-off valve 29 is mounted on the branch line 28. By opening the shut-off valve 29, a part of water held by the cooling water pool 21 is fed to an outer pool 15 so as to raise the water of the outer pool 15 to a predetermined level by the use of a float valve (not shown) or the like. With this arrangement, during the normal operating condition, the outer pool 15 is kept at the same water level as that of a suppression pool 12, so that the water pressures acting respectively on the inner and outer surfaces of a primary containment vessel 10 are almost the same, thereby preventing the buckling of the wall of the primary containment vessel 10. In the event of an accident, heat radiation characteristics are enhanced because of the raised water level of the outer pool 15. The other portions of the nuclear reactor installation of this embodiment are the same as those of the embodiment of FIG. 1, and therefore explanation thereof is omitted.

Figure 11:
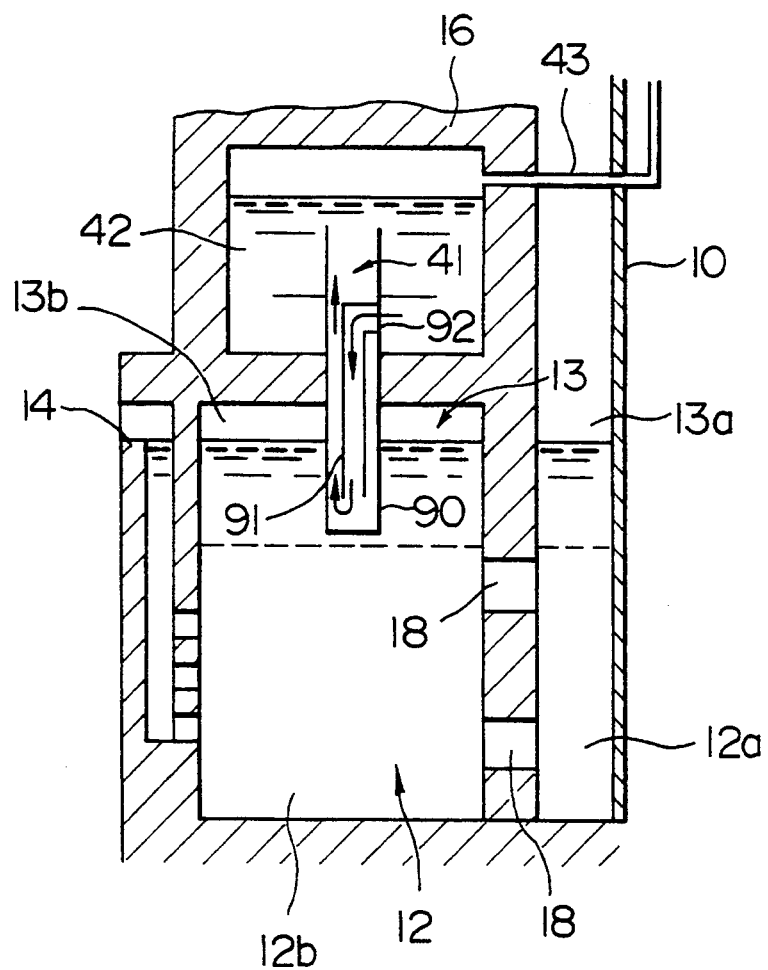
FIG. 11 is a vertical cross-sectional view of a nuclear reactor installation according to a fourth embodiment of the present invention, showing a portion thereof in the vicinity of a pressure suppression pool.

FIG. 11 shows a fourth embodiment of the present invention. This embodiment differs from the embodiment of FIG. 1 in that instead of using the outer pool system, lower end portions of a plurality of double-walled heat transfer tubes 41 are disposed in a suppression pool 12 whereas the upper end portions thereof are disposed in a cooling pool 42 disposed above the suppression pool 12. An exhaust line 43 is connected between a gas-holding portion of the cooling pool 42 and the exterior of a primary containment vessel 10.

By water held by a gravity-driven ECCS, the suppression pool 12 is raised to a water level higher than its normal water level indicated by a broken line, and the lower end portions of outer tubes 90 of the double-walled heat transfer tubes 41 are heated by the pool water. The water in the heated outer tube 90 of each double-walled heat transfer tube 41 rises and flows into the cooling pool 42, disposed above the suppression pool 12, by a natural convection, thereby raising the temperature of the water in the cooling pool 42. An inlet 92 of an inner tube 91 of each double-walled heat transfer tube 41 is disposed at a lower portion of the cooling pool 42, and therefore the cooling water of low temperature descends through the inner tube 91. Since the inner tube 91 and the outer tube 90 are communicated with each other at the lower end portion of the double-walled heat transfer tube 41, the water in the outer tube 90 is again heated by the suppression pool 12, and is raised, thus forming a circuit for the water.

In this manner, the decay heat accumulated in the suppression pool 12 is transferred to the cooling pool 42 via the double-walled heat transfer tubes 41, and finally the water in the cooling pool 42 evaporates, and is discharged from the exhaust line 43 to the exterior of the primary containment vessel 10. Therefore, the temperature rise of the suppression pool 12 is suppressed, thereby reducing the steam partial pressure. The other portions of same as those of the embodiment of FIG. 1, and therefore explanation thereof is omitted.

Figure 12:
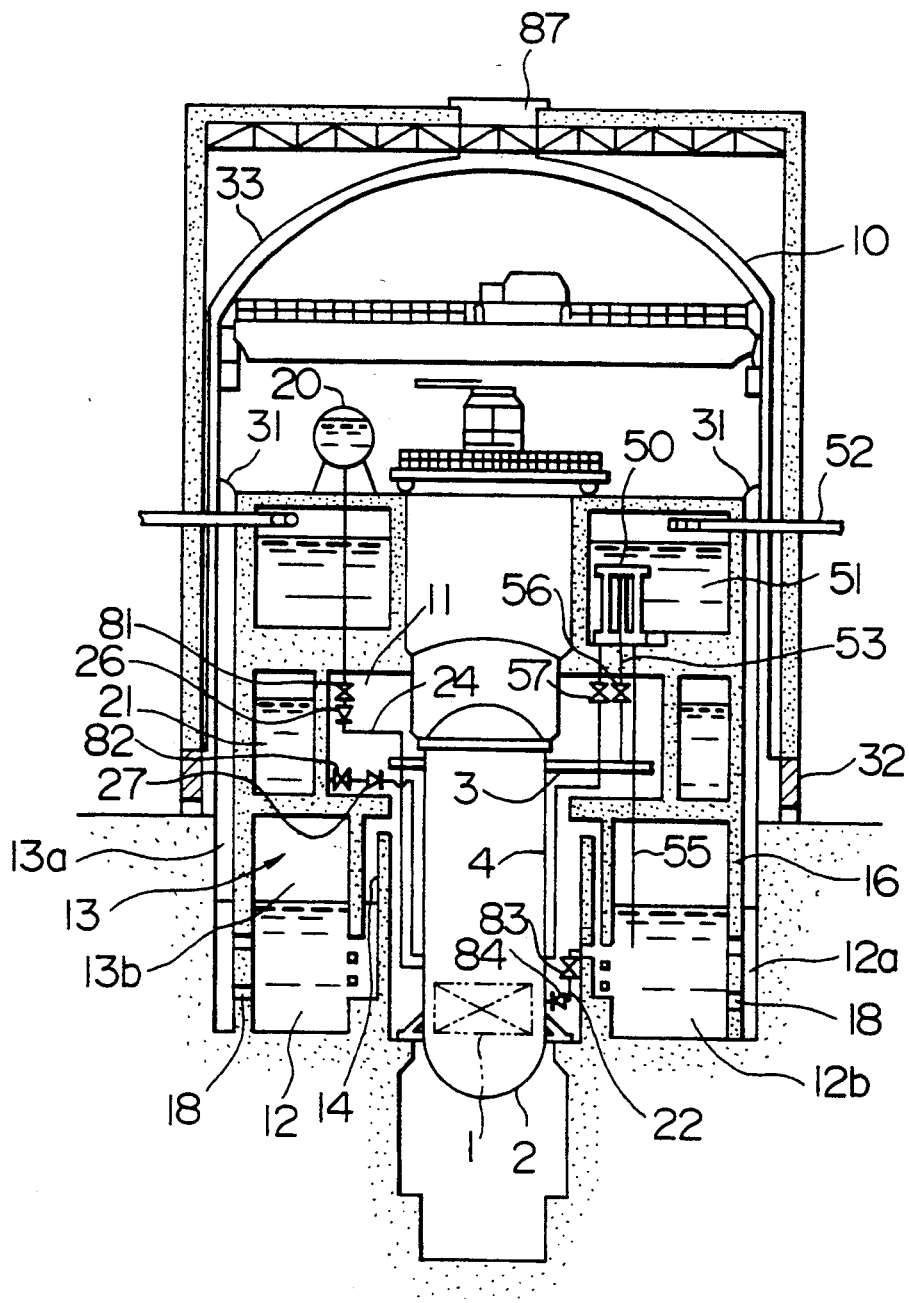
FIG. 12 is a vertical cross-sectional view of a nuclear reactor installation according to a fifth embodiment of the present invention.
Figure 13:
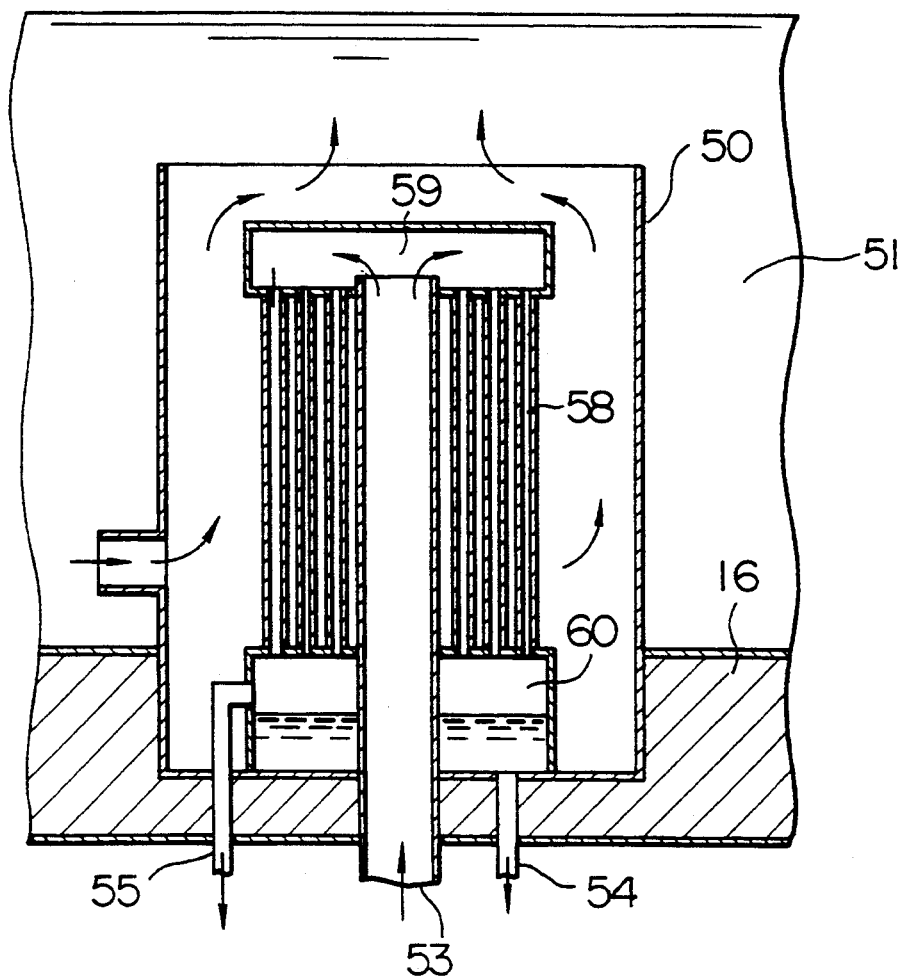
FIG. 13 is an enlarged, vertical cross-sectional view of an important portion of FIG. 12.

FIG. 12 shows a further embodiment of the present invention. This embodiment differs from the embodiment of FIG. 1 in that the outer pool is replaced by a cooling system of a steam condensation type in which steam is fed to a plurality of heat exchangers 50, provided in a cooling pool 51 mounted above a reactor pressure vessel 2, via a line 53 branched from a main steam line 3, thereby condensing the steam produced at a reactor core 1.

Each of the heat exchanger 50 is of a shell-and-tube type, and comprises a plurality of heat transfer tubes 58, a plenum 59 mounted on the upper ends of the heat transfer tubes 58 so as to distribute the steam, and a plenum 60 mounted on the lower ends of the heat transfer tubes 58 so as to collect the condensate. In the heat exchanger 50, the steam flowing through the heat transfer tubes 58 are condensed by water on the shell side. Non-condensable gas contained in the steam is separated from the condensate by the plenum 60, and the condensate is returned under gravity to the reactor pressure vessel 2 via a line 54. then, the non-condensable gas is discharged to a suppression pool 12 via a line 55. With this arrangement, the decay heat produced from the reactor core 1 is accumulated in the cooling pool 51 by the heat exchangers 50 utilizing the steam condensation, and the steam resulting from the evaporation of the water in the cooling pool 51 is discharged to the exterior of the containment vessel via a line 52, thereby achieving a heat radiating function. In the event of an accident, shut-off valves 56 and 57 mounted respectively on the lines 53 and 54 are opened, thereby obtaining the steam condensation operation by the heat exchangers 50. In this example, a cooling water pool 21 serving as a water reservoir for a gravity-driven ECCS 5 is provided below the cooling pool 51.

In any of the above embodiments, the bottom of the pools, those portions in contact with the cooling water, and those surfaces of the concrete wall which may be made in contact with the cooling water are covered with a metallic liner.

In any of the above embodiments, without the use of any powered equipment such as a pump, the decay heat produced at the reactor core can be removed based on the passive Principle, and therefore the reliability of the plant is enhanced. Also, the primary containment vessel can be expanded in such a manner to include the operation floor space, and therefore there is no need to provide a new space for achieving this expansion, and the overall reactor installation will not become unduly large even when the primary containment vessel has a large size.

The primary containment vessel is made of steel, and can include the operation floor space only at the time of the accident to provide the large heat radiation area, thereby enhancing the heat radiation ability. Therefore, advantageously, the nuclear reactor installation using this primary containment vessel can be of a compact construction.

The plurality of emergency reactor core cooling systems effect the natural supply of the cooling water in association with one another to thereby achieve the long-period cooling function, and therefore the cooling reliability is enhanced. Further, the lower portion of the dry well is submerged, and accordingly, even though an extraordinary core melt accident occurs, the soundness of the primary containment vessel can be ensured.

Since the emergency core cooling systems are all disposed within the primary containment vessel, it is possible to restrain accidents of radio-active leakage to the outside of the primary containment vessel through the emergency cooling systems, and accordingly, the safety of the nuclear reactor installation can be enhanced.

The upper communication holes among those formed in the concrete structure walls partitioning the outer peripheral section and the inner peripheral section of the pressure suppression pool from each other, are located above the outlet of the vent tube and above the normal level of the water in the suppression pool, and accordingly, the cooling water from the emergency core cooling systems can flow into the inner peripheral section of the suppression pool, overflowing the outlet of the vent tube, and then into the outer peripheral section of the suppression chamber through the upper communication holes, smoothly, without substantial restriction. Accordingly, the level of water in the outer peripheral section can be soon raised, resulting in an increase in the heat transfer area through which the heat is radiated from the outer peripheral section of the suppression pool into the outer pool.

The provision of the heat accumulator in the external pool allows the temperature difference between the suppression pool and the external pool to increase, resulting in that the heat radiation from the suppression pool to the external pool is made for a long period, thereby it is possible to increase the capacity of heat radiation.

The external pool is replenished with cooling medium so as to increase the level of water in the external pool, resulting in that the temperature of cooling medium in the external pool and the lowering of the level water therein due to evaporation can be restrained. Accordingly, the heat radiation from the pressure suppression pool to the external pool can be made for a long period, and the capacity of the heat radiation can be increased.

With the provision of the natural draft cooling means for cooling the upper section of the steel primary containment vessel with the use of the ambient air while the lower section of the primary containment vessel is cooled by the water in the external pool surrounding therearound, and accordingly, the primary containment vessel can be efficiently cooled in its entirety, and the cooling installation with no powered units enhance the reliability of the nuclear reactor installation.

The provision of the steam condenser, in stead of the external pool, allows the steam which is generated from the reactor core after an accident to be condensed in the heat-exchangers so as to accumulate the heat thereof in the cooling water pool from which water is therefore evaporated. With this evaporation of the water, the decay heat can be effectively radiated externally from the primary containment vessel, thereby it is Possible to suitably restrain the pressure of the inside of the primary containment vessel.

The provision of the heat transfer pipe, instead of the external pool, having its lower end part disposed in the suppression chamber and its upper end part disposed in the cooling water pool, allows the suppression pool to be cooled by the natural convection. Accordingly it is possible to restrain the temperature of the suppression pool from rising.

The inside of the steel primary containment vessel is divided into two spaces, the first space containing therein the pressure vessel and the second space containing therein the operation floor, which are isolated, in a fluid-tight manner, from each other by the partition means, and which are communicated with each other by the opening and closing means provided in the partition means. Accordingly, in the event of an accident, the opening and closing means is opened so as to apparently enlarge the volume of the pressure suppression chamber up to that including the first space containing therein the operation floor, resulting in an increase in pressure absorption Capability, thereby it is possible to enhance the durability of the primary containment vessel even under the accident of a long period. Further, the heat radiation can be made along the wide surface area of the primary containment vessel including the operator floor space, and accordingly, it is possible to enhance the effect of cooling. Further, the upper section of the primary containment vessel is used for the operation floor which is inevitable for the nuclear reactor installation, and accordingly, no extra space exists in the primary containment vessel. Thereby, an excessive increase in the volume of the primary containment vessel can be restrained as far as possible.

Within the steel primary containment vessel in which the operational floor space can be included in the suppression chamber which is therefore enlarged substantially in the event of an accident, there are provided emergency core cooling systems, such as an accumulator type emergency core cooling system and a gravity-driven emergency core cooling system, in combination of water-cooling and air cooling systems for the primary containment vessel, which are operated by natural power sources given by natural convection, thermal transmission, condensation and evaporation, so as to constitute a fail-safe system. Thereby, it is possible to prevent the primary containment vessel from having an excessively large size and to enhance the reliability of the nuclear reactor installation. Further, with the use of the static or passive safe system installation, it is possible to aim at simplifying the system structure and at miniaturizing the primary containment vessel, thereby it is possible to enhance the easiness of building and the economy thereof.

While the preferred embodiments of the present invention have been specifically described with reference to the drawings, the invention is not limited to the above-mentioned embodiments, and various modifications can be made thereto without departing from the scope defined by the appended claims.

What is claimed is:

1. A nuclear reactor installation, said nuclear reactor installation comprising a reactor pressure vessel containing a reactor core; a concrete structural portion enclosing and holding said reactor pressure vessel; a dry well formed within said concrete structural portion and enclosing said reactor pressure vessel, said dry well having an upper portion and a lower portion; a primary containment vessel enclosing therein said concrete structural portion; a pressure suppression chamber having therein a pressure suppression pool, a vent tube communicating between said dry well and said suppression pool and having an upper outlet; and an accumulator-type emergency core cooling system, a gravity-driven emergency core cooling system and an equalizing system for submerging said reactor core, which are mounted within said primary containment vessel;

said accumulator-type emergency core cooling system including a pressure accumulator tank holding cooling water under a predetermined accumulation pressure, and first closing and opening means communicated with said pressure accumulator tank, said first closing and opening means being opened when the pressure in said reactor pressure vessel decreases below said predetermined accumulation pressure in the event of a coolant loss accident, thereby supplying the cooling water from said pressure accumulator tank into said reactor pressure vessel to cool said reactor core;

said gravity-driven emergency core cooling system including a cooling water pool provided above said reactor core, and second closing and opening means communicated with said cooling water pool, said second closing and opening means being opened when the pressure in said reactor pressure vessel decreases to a certain level below said predetermined pressure, thereby supplying the cooling water from said cooling water pool into said reactor pressure vessel under gravity, and the cooling water fed from said cooling water pool overflowing said reactor pressure vessel to fill in the lower portion of said dry well, and then flowing into said suppression pool so as to raise the water level of said suppression pool;

said equalizing system including third closing and opening means which is opened when the water level of said suppression pool increases above a predetermined level, so as to feed the cooling water from said suppression pool into said reactor pressure vessel, thereby submerging said reactor core to cool the same.

2. A nuclear reactor installation according to claim 1, wherein said primary containment vessel is made of steel, an outer pool is provided, surrounding the lower portion of said primary containment vessel, for cooling said suppression pool.

3. A nuclear reactor installation according to claim 2, wherein said concrete structural portion includes an outer peripheral wall having a lower portion, said suppression pool is divided by said outer peripheral wall into an outer portion and an inner portion, said outer portion and said inner portion being communicated with each other via upper and lower communication holes formed through the lower portion of said outer peripheral wall.

4. A nuclear reactor installation according to claim 3, wherein said upper communication holes are located above the outlet of said vent tube and above a normal water level of said suppression pool, and said lower communication holes are located below the outlet of said vent tube and below the normal water level of said suppression tube.

5. A nuclear reactor installation according to claim 3, wherein said upper communication holes are disposed below a normal water level of said suppression pool, steam fed from said reactor pressure vessel into the inner portion of said suppression pool is condensed in the case of emergency and also increases the pressure in said inner portion of said suppression pool, so that the cooling water in the inner portion of said suppression pool is urged by said increased pressure into the outer portion of said suppression pool to raise the water level of said outer portion of said suppression pool.

6. A nuclear reactor installation according to claim 2, wherein a heat accumulator is provided in said outer pool.

7. A nuclear reactor installation according to claim 1, wherein a steam condenser is provided in said cooling water pool, steam being fed from said reactor pressure vessel to said condenser, so that said steam is condensed into condensate, said condensate being returned to said reactor pressure vessel, and gas contained in said steam and not condensed being discharged to an inner portion of said suppression pool.

8. A nuclear reactor installation according to claim 2, wherein a heat-exchange between the cooling water in said cooling water pool and the cooling water in said suppression pool is effected through a heat exchanger.

9. A nuclear reactor installation according to claim 2, wherein a cooling water supply system having closing and opening means is provided in said outer pool, said closing and opening means of said cooling water supply system being opened upon an accident, so as to replenish said outer pool with cooling water, thereby raising the level of the cooling water in said outer pool.

10. A nuclear reactor installation according to claim 2, in which air-cooling means using the ambient air is provided at an upper portion of said primary containment vessel.

11. A nuclear reactor installation comprising:
a pressure suppression chamber enclosing a reactor pressure vessel and having therein a pressure suppression pool and a gas-phase space above said pressure suppression pool;
an operation floor;
a primary containment vessel made of steel and enclosing said pressure suppression chamber and said operation floor, and having upper and lower portions, and an interior;

partition means dividing the interior of said primary containment vessel into a first space containing said gas-phase space of said pressure suppression chamber and a second space containing said operation floor in such a manner that said first and second spaces are isolated from each other, said partition means sealing said first and second spaces, relative to each other;

at least one opening and closing means provided in said partition means, for communication the first and second spaces with each other when said opening and closing means is opened upon an accident;

an outer pool surrounding said lower portion of said primary containment vessel; and an air-cooling means surrounding said upper portion of said primary containment vessel.

12. A nuclear reactor installation according to claim 11, wherein said air-cooling means comprises a plurality of natural ventilation ducts covering the upper portion of said primary containment vessel.

13. A nuclear reactor installation according to claim 11, wherein said opening and closing means comprises a valve openable by a pressure difference between said first and second spaces.

14. A nuclear reactor installation according to claim 12, wherein said openable valve has a rupture disk.

* * * * *